United States Patent [19]

Wagner

[11] 4,331,858

[45] May 25, 1982

[54] OPEN HEARTH OVEN

[75] Inventor: Dennis L. Wagner, Ballwin, Mo.

[73] Assignee: Pet Incorporated, St. Louis, Mo.

[21] Appl. No.: 168,572

[22] Filed: Feb. 14, 1980

[51] Int. Cl.³ ............................................. H05B 1/00
[52] U.S. Cl. .................................... 219/405; 432/65;
       219/411; 126/190; 126/198
[58] Field of Search ............... 219/405, 411, 354, 388,
       219/390; 126/190, 198, 193, 191, 192, 194, 200;
       430/65

[56] References Cited

U.S. PATENT DOCUMENTS

| 228,548 | 6/1880 | McDonald | 432/65 |
|---|---|---|---|
| 729,026 | 5/1903 | West | 126/190 |
| 1,079,266 | 11/1913 | Rockwell | 432/65 |
| 1,652,322 | 12/1927 | Peck | 432/65 |
| 1,829,290 | 10/1931 | Merrill | 219/388 |
| 2,121,284 | 6/1938 | Challet | 126/198 |
| 2,289,354 | 7/1942 | Gardner | 432/68 |
| 3,095,186 | 6/1963 | Sondy | 219/390 |
| 3,649,812 | 3/1972 | Wilson | 219/388 |
| 3,864,847 | 2/1975 | Friedman | 219/354 |
| 4,092,390 | 5/1978 | Mulvany, Jr. | 219/405 |

FOREIGN PATENT DOCUMENTS 1304208  4/1902  France .................................. 432/65

Primary Examiner—Roy N. Envall, Jr.
Assistant Examiner—Bernard Roskoski
Attorney, Agent, or Firm—Kalish & Gilster

[57] ABSTRACT

An open hearth oven having an opening at the front thereof is provided with a shield arrangement for shielding against escape through the oven opening of infrared radiation emitted by radiating elements within the oven chamber. The shielding structure permits the introduction of objects into the oven chamber for being heated therein by infrared radiation while reflecting radiation back into the oven chamber. The shielding is configured and positioned for allowing introduction and removal of the objects without movement or removal of the shielding. Yet it is swingably mounted for being swung upwardly to a retracted position for facilitating access to the oven chamber through the opening. The shielding may be lowered in the retracted position but is selectively released to swing to the radiation blocking position as by use of a peel, such as utilized for handling of food products. The shielding is also readily removable from the oven, such as for cleaning.

5 Claims, 13 Drawing Figures

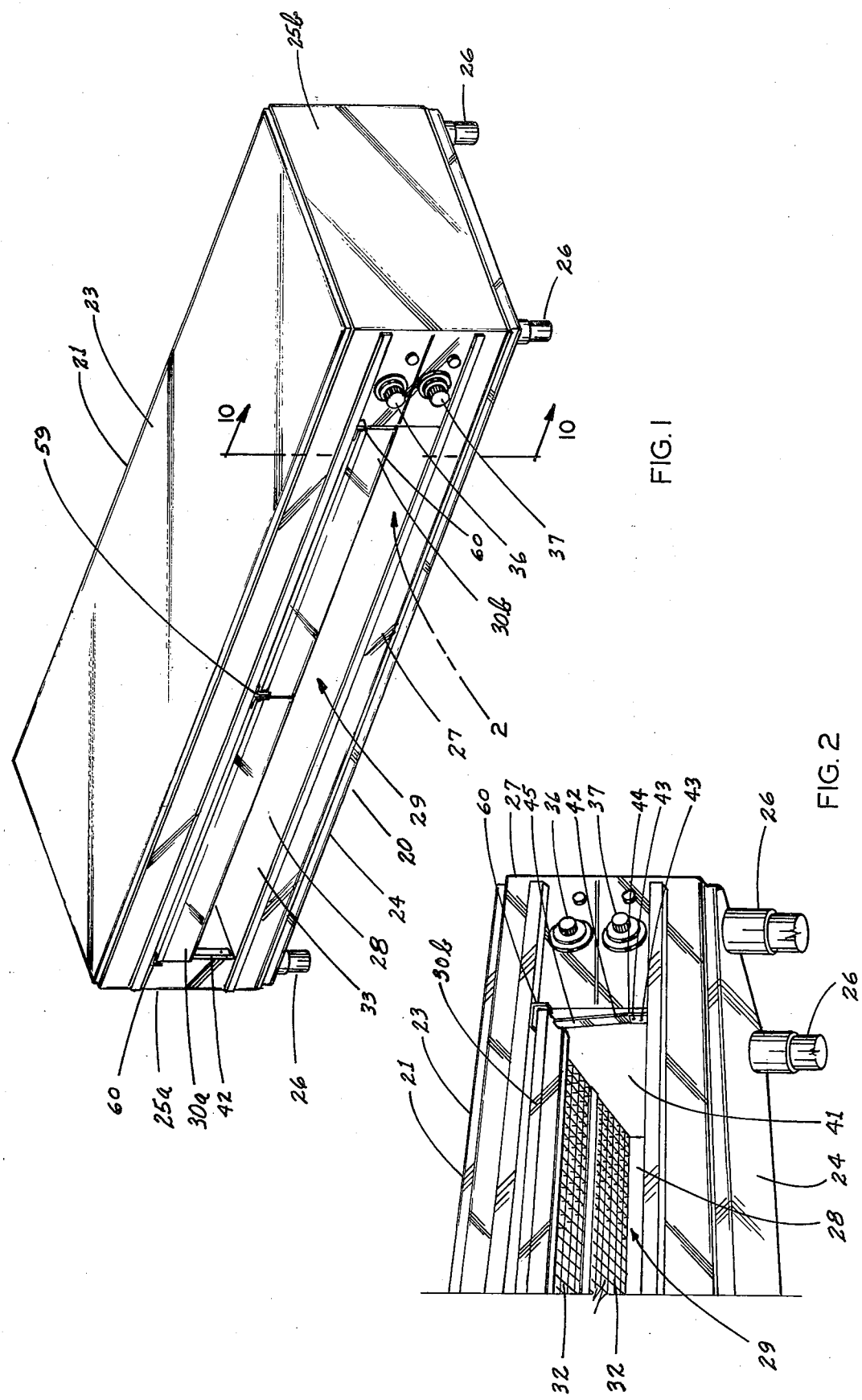

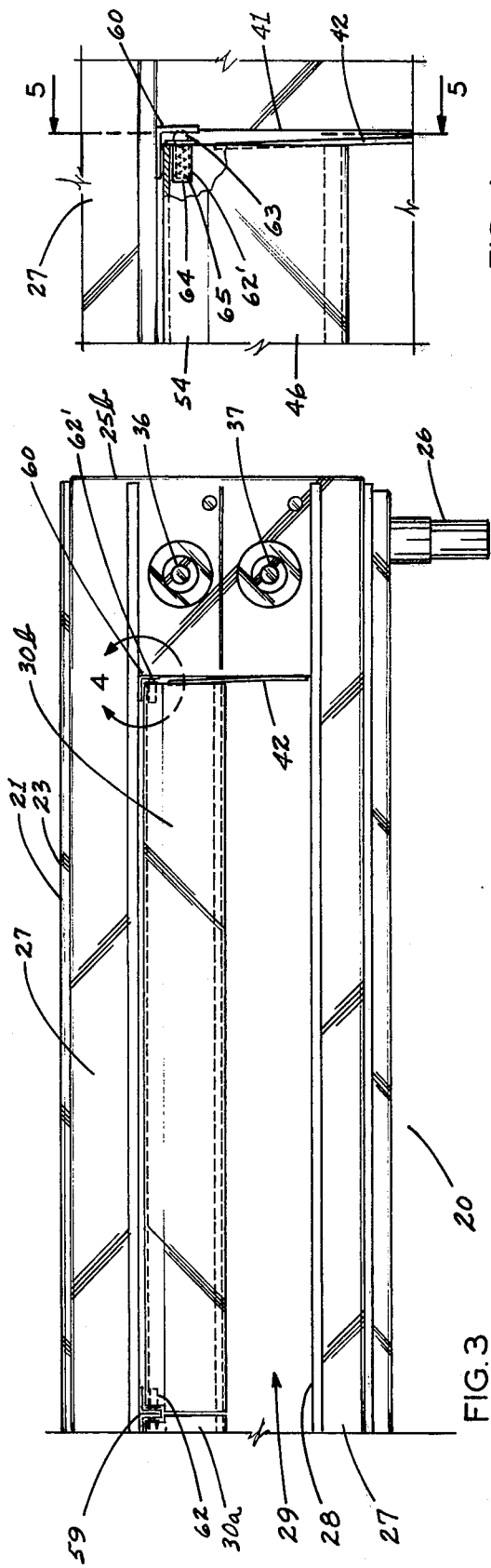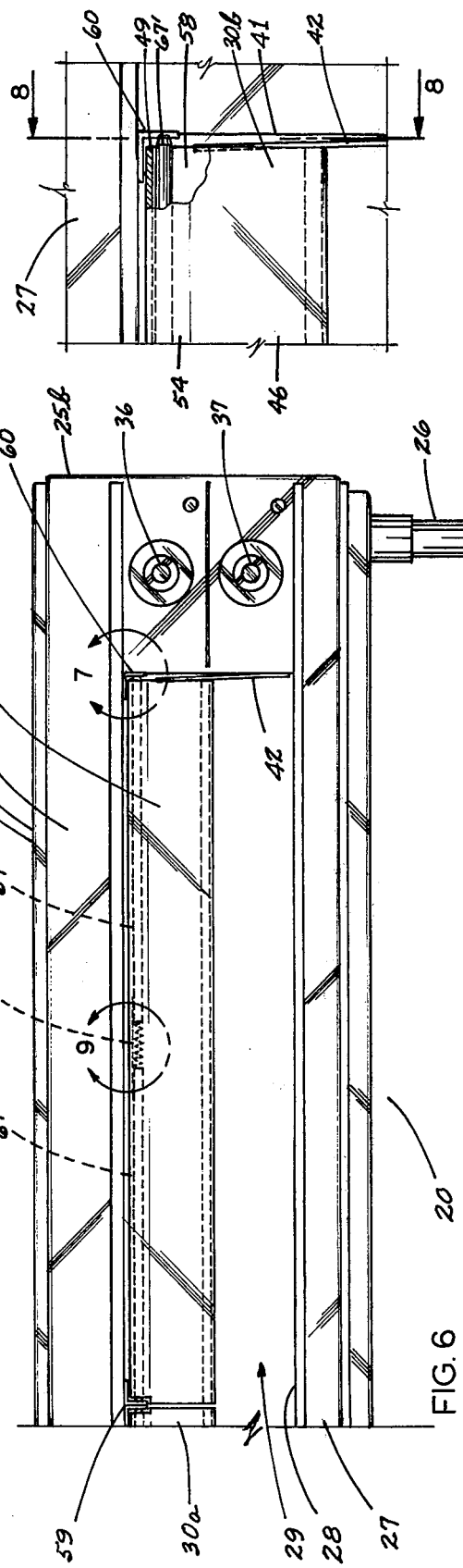

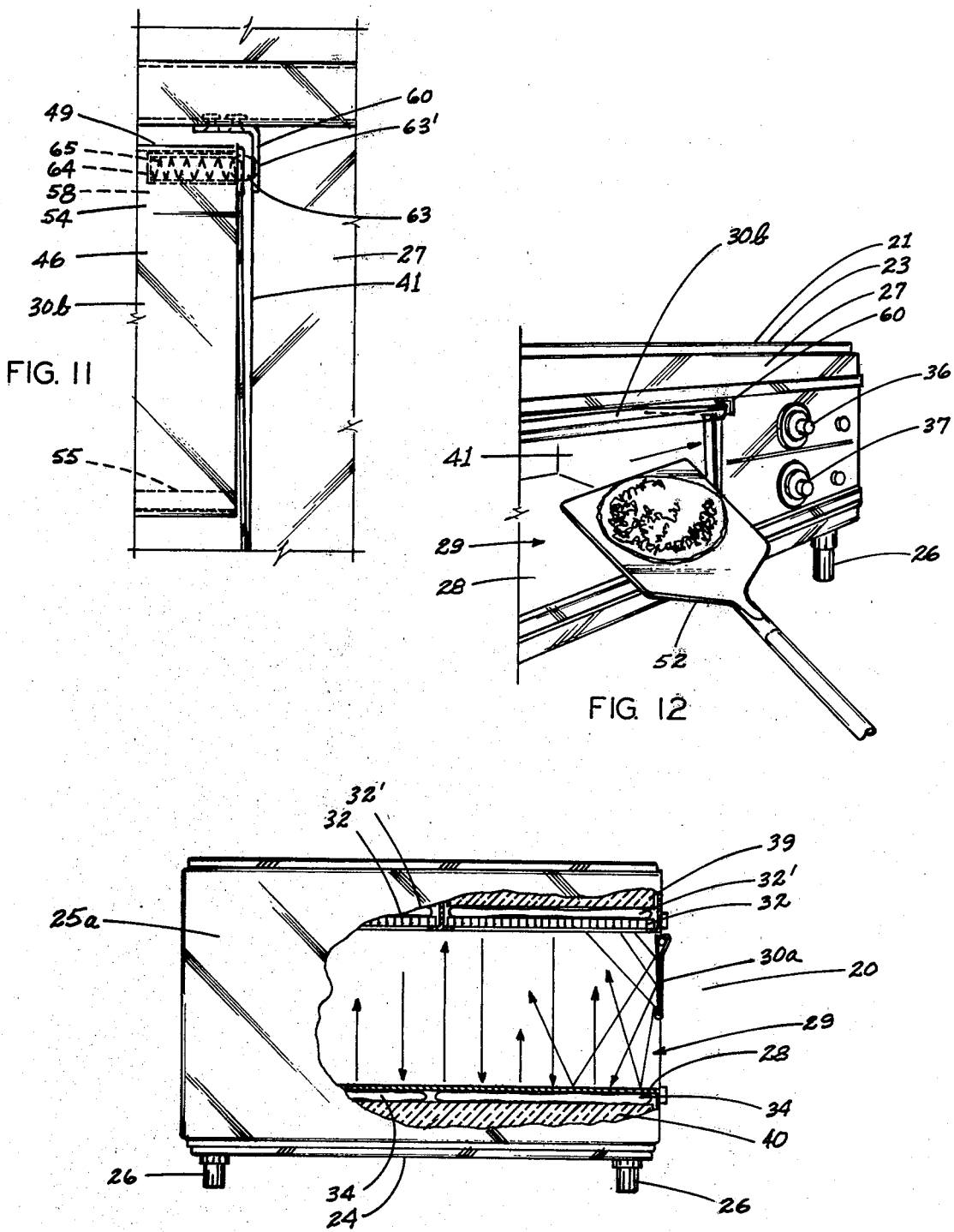

OPEN HEARTH OVEN

BACKGROUND AND SUMMARY OF THE INVENTION

The invention relates to heating or cooking apparatus and, more particularly, to an oven of the type heating products within a chamber by the emission of infrared radiation and to the equippage of such an oven with shielding for blocking or reducing the escape of infrared radiation from the oven opening.

It has previously been known to utilize infrared radiation for heating of food and other products by providing an oven or other chamber with infrared emitters such as of the type disclosed in co-assigned U.S. Pat. No. 3,809,859 of Harold D. Wells, entitled "Infrared Emitter". An oven of the type utilizing such emitter is disclosed in co-assigned U.S. Pat. No. 4,008,996 of Harold D. Wells, entitled "Multiple Tier Oven". One particular type of oven utilizing such infrared emitters is of the so-called open hearth type wherein the oven chamber is provided with a floor constituting a metal hearth which is heated by infrared elements. The hearth provides emission of infrared energy into the chamber for heating of food and other products. The chamber may preferably also have infrared emitter panels along its roof for radiating energy into the articles to be heated. But the chamber is open at the front, hence the appellation "open hearth".

Ovens of the type using infrared emitter panels as described above do not heat articles by heated air, whether confined, forced or otherwise, Nor do they utilize redhot glowing wire or ribbon elements. Rather, the infrared radiation utilized is typically of much lower temperature than such glowing elements.

But in such an open hearth oven, infrared energy may escape through the oven opening causing heating of nearby objects and persons. This also reduces oven efficiency. In addition, air present within the oven chamber is unavoidably heated by contact with the infrared heat sources and rises from the oven opening, further reducing oven efficiency.

Accordingly, it is an object of the invention to provide an open hearth oven with shielding for blocking the escape of infrared radiation through the oven opening.

It is another object of the invention to provide such shielding for reducing the escape of heated air from the oven chamber.

A further object of the invention is the provision of such an oven including shielding of the character stated not interfering with access to the oven chamber or with viewing of articles within the oven chamber.

Another object of the invention is the provision of such an oven having shielding of the character stated mounted for being selectively retracted to increase the access area through the oven opening, and further, which can be caused to remain in the retracted position yet can be easily and quickly returned to the radiation blocking position.

Yet another object of the invention is the provision of such an oven having radiation shielding of the character stated which can be readily removed from the oven.

Other objects and features will be in part apparent and in part pointed out hereinbelow.

DESCRIPTION OF THE DRAWINGS

FIG. 1 is a perspective view of an open hearth oven including an infrared energy reflective shield and constructed in accordance and embodying the present invention.

FIG. 2 is a further perspective view showing a fragmentary portion of the oven taken generally in the direction indicated by a directional 2 in FIG. 1.

FIG. 3 is a partial front elevation of the oven equipped with the new shield.

FIG. 4 is an enlarged portion, in front elevation, taken along detail line 4 in FIG. 4.

FIG. 6 is a similar front elevation of portions of the oven and shield, similar to FIG. 3, but depicting a further embodiment of the shield.

FIG. 7 is an enlarged view, taken along detail line 7 of FIG. 6, showing in front elevation portions of the shield embodiment of FIG. 6.

FIG. 11 is an enlarged detail of a shield securement feature, in front elevation, taken generally along line 11—11 of FIG. 10.

FIG. 12 is a perspective view of portions of the oven, illustrating operation of a shield securement feature by a pizza peel.

FIG. 13 is a simplified cross-sectional view of portions of the oven, as broken away, illustrating an infrared radiation reflection pattern produced by the shield.

Corresponding reference characters indicate corresponding parts throughout the several views of the drawings.

DESCRIPTION OF THE PREFERRED EMBODIMENT

Figure 9:
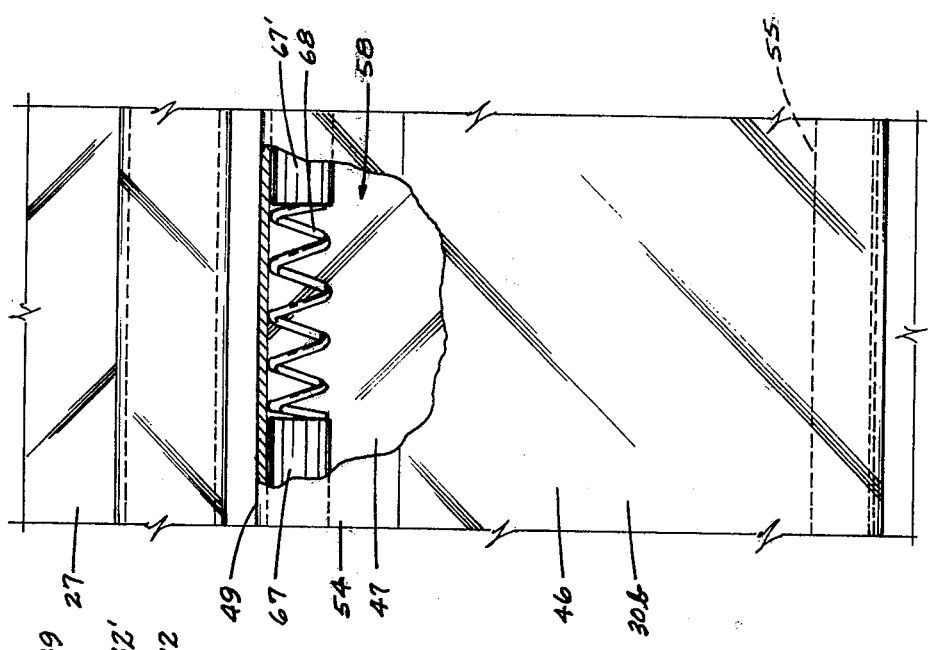
FIG. 9 is an enlarged detail view, in front elevation, of portions of the shield embodiment depicted in FIG. 6, and taken along detail line 9 of FIG. 6.

Referring now to the drawings, reference numeral 20 generally indicates an open hearth oven equipped with infrared shielding in accordance with the present invention. Oven 20 has a generally rectangular housing 21 having a flat top 23 and flat bottom 24, and vertical sides 25a, 25b. The housing is provided with four pedestal-type legs 26 for location of the housing upon a restaurant counter, table, or the like. Legs 26 may be removed and the housing 21, because of its flat top and bottom, may be stacked as a tier deck unit, one atop another, to provide a stacked array of open hearth oven units of the present character. Located within the front face 27 is a rectangular opening or mouth 28 of the oven.

Fitted within mouth 28 are a pair of door-like infrared reflection shields 30a, 30b, in accordance with the present invention. Said shields 30a, 30b are intended to reflect infrared radiation emitted from infrared panels, as at 32, so as to prevent the reflected radiation from escaping through mouth 28.

An oven of the present character is most preferably utilized for the heating of primarily partially prepared or frozen foods such as pizza pies, pastries, etc. so as to effect requisite heating thereof to permit their being served, as in fast food and restaurant service, especially where there is a demand for servings in relative volume and minimum time. But oven 20 has myriad applications for industrial and commercial use. Therefore, reference herein to the use of said oven in conjunction with cooking or other heating of food articles or items is merely exemplary and is not to be interpreted as restrictive.

Panels 32 have infrared heating elements 32' which preferably are of the type described in Wells U.S. Pat. No. 3,809,859, entitled "Infrared Emitter". It is to be understood that such elements do not provide convective heating or forced air heating but rather are radiant devices operated at modest temperatures such as several hundred degrees and provide heating of objects such as food articles and other comestibles within the oven by emission of infrared radiant energy.

In addition to the infrared panels 32 upon the roof of the oven, the oven is provided with a metal hearth 32 which extends substantially the full width and depth of the interior of the oven, being for example, of steel or steel alloys, and being heated by similar infrared elements, such as designated at 34 in FIG. 13, whereby the hearth itself constitutes a source of infrared radiation for conveying radiant energy to food or other objects in the interior or chamber 29 of the oven.

Located upon front panel 27 are conventional temperature setting controls 36, 37 for setting the top and bottom temperatures of the oven. Although not shown, conventional temperature sensing elements are associated with hearth 33 and with the upper heating panels 32 for sensing of the temperatures of the top and bottom infrared radiant energy sources. Such temperature controls are well known to those skilled in the art. Located above the upper heating elements 32' is a layer 39 of fibrous insulating material, there being a similar layer 40 below the lower elements 34.

Infrared energy emitted from the upper and lower sources, panels 32 and hearth 28, are predominantly radiated in the direction normally outward therefrom, and with the upper panels 32 radiating thus toward the hearth 28 and the latter radiating toward the upper panels 32. However, there does tend to be radiation in directions other than normal to the emitting surface. For this reason, a person standing next to the oven mouth 28 will be exposed to the infrared radiation and thus tend to experience a degree of heating from the oven which is undesirable. For example, a person adjacent the oven may feel some heating as a result of the infrared radiation incident upon him.

Although it is thus to be understood that heating of items of food or other objects in the oven is not carried out by convective heating, direct conduction, or other contact with the air within chamber 29, as in forced air or convective heating ovens, but rather by the incidence upon such food and other items of infrared energy emitted by the hearth 28 and upper panels 32, it will be appreciated that air which is present within chamber 29 will inevitably be heated by contact with the sources of such infrared sources of heat. It is desired to prevent such heated air from rising from the mouth 28 of the oven, as may tend to occur with open hearth units of the type described which typically remain open at all times.

The outward lossy infrared radiation as well as the lossy circulation of air which is incidentally being convectively heated by exposure to the radiant services conduce to reduced efficiency of the oven.

These losses could be avoided by entirely closing the oven mouth 28 as by doors. Yet, doors would interfere with access to the interior 29 of the oven, as well as presenting an encumbrance to the visual inspection of items being heated in the oven, and fully entrap air within the oven chamber. Furthermore, it is desired, in some usages, such as the heating of pizza pies, etc. to be able to freely reach in and out of the oven, as with the conventional pizza peel, for insertion or removal of the items from the oven. In any event, the provision of doors for closing the chamber would destroy the desirable open-hearth character of the oven and heat air therein excessively.

Shields 30a, 30b, do not close the oven but are hingedly secured in side by side position across the full width of the oven mouth 28, extending substantially only half the distance from the top of the oven mouth to the hearth 33. Accordingly, the shields do not interfere with the visual inspection of items in the oven and also permit a pizza peel or other utensil to be extended into the oven without interference. Yet, such shields 30a, 30b provide effective reflection of the infrared energy which is being emitted from the upper panels 32 and hearth 33, as shown in FIG. 13.

Figure 10:
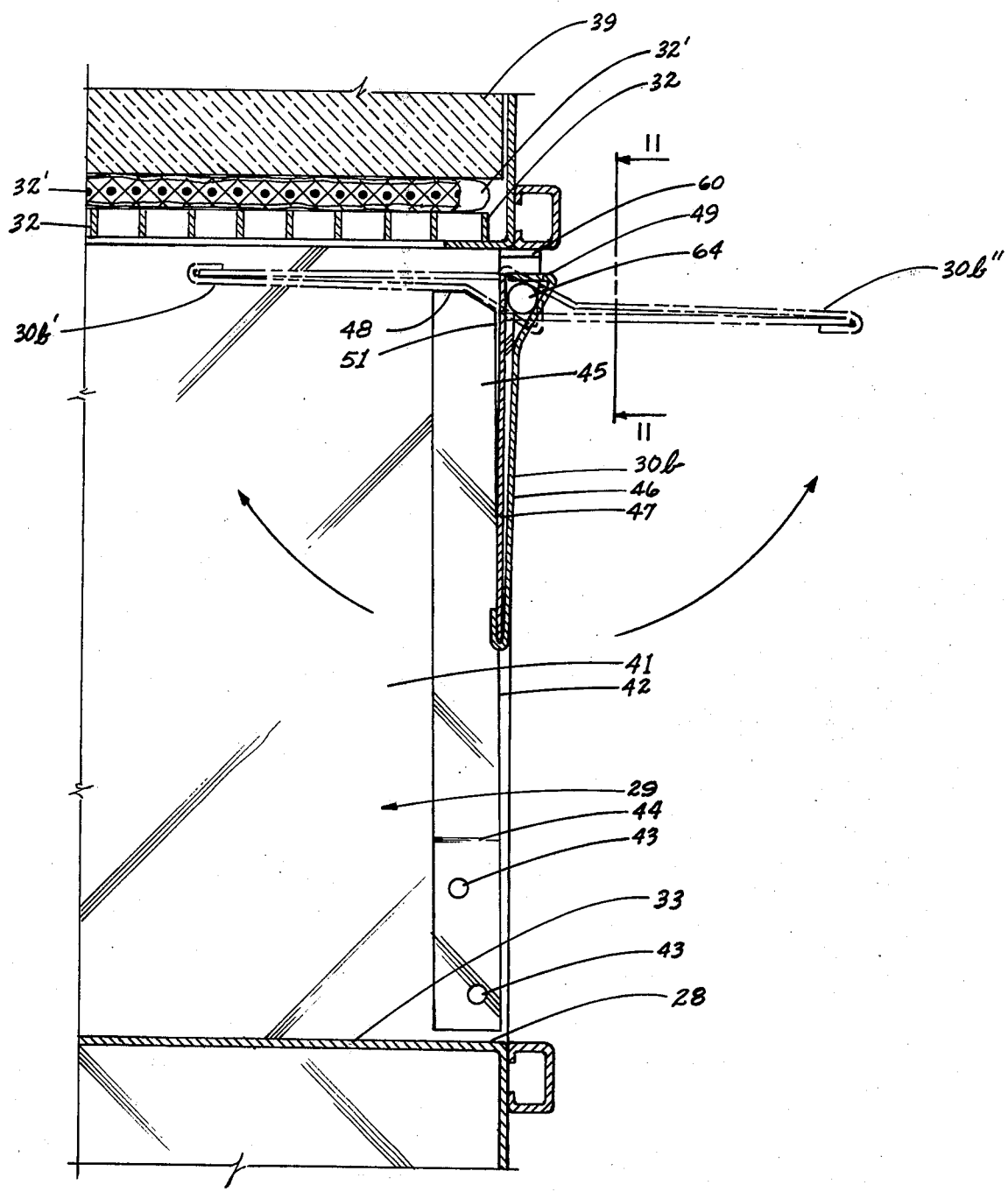
FIG. 10 is an enlarged cross-sectional view of the oven and shield taken generally along line 10—10 of FIG. 1.

Referring now to FIG. 10, each of shields 30a, 30b is mounted for swinging movement as indicated by the capability of shield 30b being moved to an inwardly retracted position 30b', or to an outwardly retracted position 30b". This allows each shield to be swung in either direction, as desired, as for inserting or removing a large object from the oven as well as for enabling the user of the oven to have unobstructed access through the oven mouth 28, such as for placing or removing objects upon hearth 33 or for cleaning and/or inspecting the oven, etc.

For latching each of the shields in either inward or outward retracted position, there is provided along each side wall 41 of the oven in immediate adjacency to the mouth 28 a strip 42 of resilient metal, such as of stainless steel or plated steel or the like, and secured at its lower end as by rivets 43 to the side wall. Said strip 42 is swung slightly outwardly upon a line of bending 44 whereby the upper end 45 is located a small distance outwardly from the surface of the side wall, as depicted in FIG. 2 as well as in FIGS. 3 and 6. Said upper end 45 may be resiliently deflected toward the wall.

Each of shields 30a, 30b is provided with an outer panel 46 as well as an inner panel 47 of a configuration more fully described hereinbelow. However, it is noted for present purposes merely that the outer panel 46 is adapted to engage the upper edge 48 of strip 42, which may be contoured for such purpose, whereby when the doors are swung to the retracted position as shown in FIG. 10, at 30b', said upper edge 48 will cause the shield to be maintained in its retracted position. Also, the outer panel 46 of each shield is provided with a recurved portion 49 which lies in a plane at a right angle to the rear panel 47. Thus, when the shield is swung to its opposite retracted position shown at 30b" in FIG. 10, said surface 49 is oriented for engaging the right hand side 51 of strip 42 and thereby to be maintained in such position. For allowing the shields to be swung to the downwardly hanging position, the upper portion 45 of strip 42 is pressed against the side wall 41 of the oven, as by nudging strip 42 with a pizza peel such as that designated at 52 in FIG. 12. The respective shield then swings down to its normal, energy-reflective position.

Figure 8:
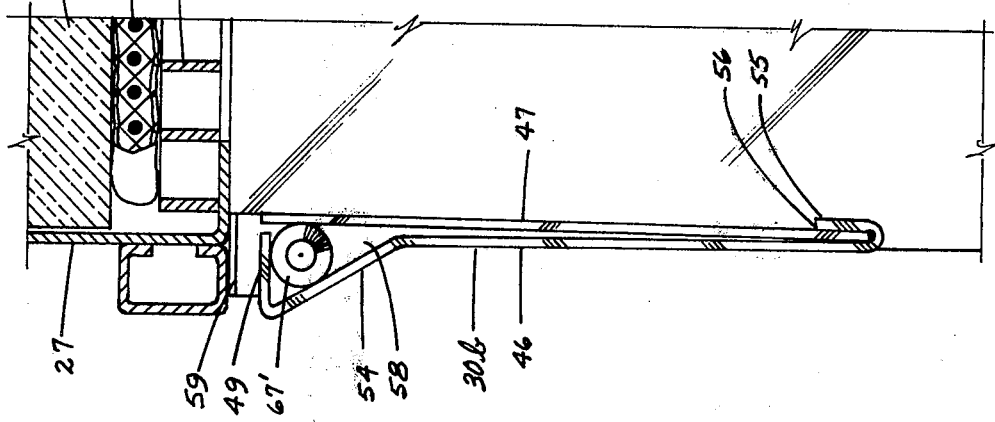
FIG. 8 is an enlarged transverse cross-section of the new oven taken generally along line 8—8 of FIG. 7.
Figure 5:
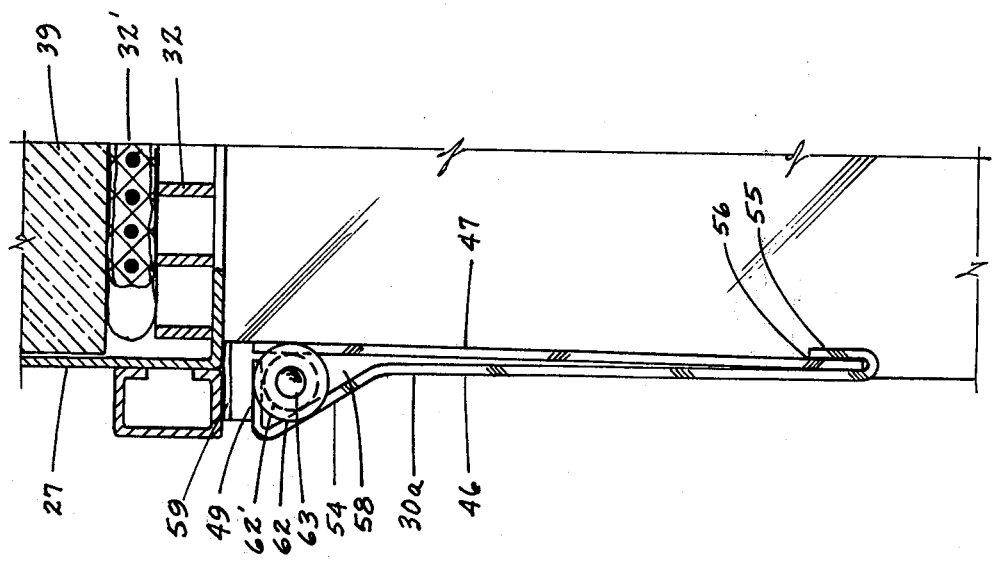
FIG. 5 is an enlarged transverse cross-sectional illustration of portions of the oven taken generally along line 5—5 of FIG. 4, illustrating features of the embodiment of the shield depicted in FIG. 3.

The configuration of the shields 30a, 30b are more clearly demonstrated in the enlarged views shown in FIGS. 5 and 8. There it will be revealed that front panel 46 is formed with a triangular cross-section defined at its upper end, by an outwardly inclined flat surface 54 which is recurved into the planar upper surface 49. At its lower end, outer panel 46 is folded back upon itself to provide a tab 55 overlying inner panel 47 and defining a recess or pocket 56 for receivingly carrying said outer panel 47. Tab 55 is secured to inner panel 47 as by spot welding, etc. Outer panel 46 is preferably of stainless steel, providing requisite cleanliness and stain-free exterior appearance while exhibiting sufficient strength for the purposes presently appearing. However, inner panel 47, being intended primarily for the reflection of infrared energy incident thereon, is preferably of a material which is highly infrared-reflective such as aluminumized steel. Other plated, coated, or treated metals might be utilized, as well as possibly stainless steel even though less reflective of infrared energy than the preferred aluminumized steel.

Surfaces 54 and 49 at the top of the outer panel define a recess 58 of triangular cross-section running the length of each shield. In said recess are located hinge components to be described below for hingedly securing said shields 30a, 30b to the oven mouth 28 along the upper edge thereof in suspended vertical position, as illustrated in FIG. 1. For this purpose, there are provided suitable brackets, such as a center bracket 59 (FIGS. 3 and 6) downwardly depending from the upper edge of the oven mouth 28, as well as downwardly depending brackets as designated at 60 at the upper corners of the oven mouth. Alternatively, the side walls of the oven chamber may be apertured for receiving hinge components of the shields.

Each of said shields 30a, 30b is provided at its opposite ends with a spring loaded mechanism for allowing removal of the respective shield from the oven, said mechanism being provided within recess 58. Two types of mechanism are disclosed.

Referring to FIGS. 3, 4, and 5, the first such mechanism includes the provision of spring buttons 62, 62' at opposite ends of shield 30b. Each of said spring buttons is represented by that designated at 62' which includes a projecting button 63 for being received by suitable aperture in bracket 60 (or the side wall of the oven chamber) and biased outwardly from a housing 64 by a compression spring 65. The spring button mechanism 62' is suitably secured within recess 58 as by spot welding, etc. Such button 62 at end of the individual shields may be pressed inwardly to allow ready removal of the respective shield from the oven, such as, for example, for cleaning, replacement, repairing, etc. FIG. 11 demonstrates the detailed provision of spring button mechanism 62' within recess 58 and with its button 63 fitted within an aperture 63' of bracket 60.

Referring to FIGS. 6, 7, 8, and 9, an alternate spring loaded arrangement is shown to include a pair of elongated rods 67, 67' each extending through recess 58 of each shield, the rods being spaced apart by a compression spring 68 whereby the outer ends of the rods 67, 67' are biased outwardly into the respective brackets 59, 60. Rods 67, 67' may be of stainless steel and thus easily maintained in a sanitary condition and without corrosion. The respective shield is readily removed by simply depressing one outer end of either rod and pulling that end of the shield outwardly away from the oven.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. In an infrared oven of the open hearth type having an oven chamber for receiving food products or the like to be heated by infrared radiation including emitting surfaces therein for directing infrared radiation into said oven, said chamber having a rectangular opening of width substantially greater than its height, the improvement characterized by an infrared radiation reflective shield hingedly disposed across substantially the entire width of said opening, said shield having a top edge located proximate the upper edge of said opening, means hingedly securing said shield to said oven to define a hinge axis substantially parallel to the upper edge of said opening for permitting swinging of said shield on said hinge axis either outwardly or inwardly with respect to said opening, said shield normally being suspended from said hinge axis for occupying a radiation-reflective blocking position for blocking only the upper portion of said opening against escape of infrared radiation while permitting the remaining lower portion of said opening to remain open, with the lower edge of said shield spaced above the lower edge of said opening to permit food products or the like to be inserted into said opening beneath the lower edge of said shield and to permit visual inspection of the contents of said chamber, said shield when swung on said hinge axis being movable to a retracted position not blocking the upper portion of said opening, latch means for causing said shield to be latched in said retracted position, said latch means being located at one side of said opening and being selectively releasable by contact pressure of a food handling object in the direction of one side of said opening to permit said shield to swing under the force of gravity from its latched to its blocking position, said shield having an infrared reflective surface facing toward the interior of said chamber, said surface being of highly infrared-reflective material for reflecting back into said chamber infrared radiation emitted within said chamber, said shield also blocking escape of air heated in said chamber.

2. In an infrared oven according to claim 1, the improvement further characterized by said infrared reflective material comprising aluminized steel.

3. In an infrared oven according to claim 2, the improvement further characterized by said shield comprising a structural outer panel and an infrared radiation-reflective secured to said panel and facing inwardly of said oven chamber, said radiation-reflective panel being of said aluminized steel.

4. In an infrared oven according to claim 3, the improvement further characterized by said latch member comprising a resilient strip secured at one end to a surface of said oven chamber and having an upper end engageable with said shield by resilient movement of said upper end outward from said surface to engage said shield for latching said shield in either an inwardly-directed or outwardly-directed substantially horizontal retracted position, said strip being selectively movable toward said surface by contact of said food handling object for disengagement with said shield to permit said shield to swing from either of said retracted positions to said blocking position.

5. In an infrared oven according to claim 4, the improvement further characterized by said hinge means conprising hinge elements carried by said shield and defining a hinge axis, said hinge elements being resiliently maintained in engagement with said oven, but being selectively movable out of engagement with said oven for removal of said shield from said oven, said structural outer panel comprising a sheet of metal formed to provide at the upper end of said shield a recess for receiving said hinge elements.

* * * * *